(Model.)
C. H. KAHLER.
POCKET KNIFE.
No. 323,938. Patented Aug. 11, 1885.
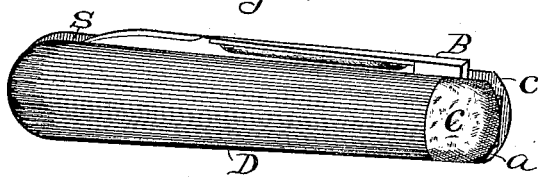
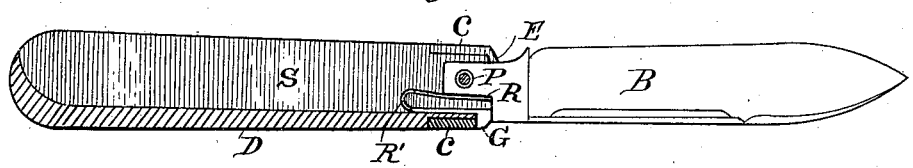
 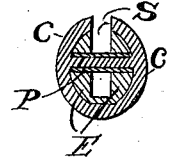 
Witnesses.
Thos. H. Hutchins.
Wm. J. Hutchins.
Inventor.
Clarence H. Kahler.

UNITED STATES PATENT OFFICE.

CLARENCE H. KAHLER, OF WILMINGTON, ILLINOIS.

POCKET-KNIFE.

SPECIFICATION forming part of Letters Patent No. 323,938, dated August 11, 1885.

Application filed January 12, 1885. (Model.)

*To all whom it may concern:*

Be it known that I, CLARENCE H. KAHLER, a citizen of the United States of America, residing at Wilmington, in the county of Will and State of Illinois, have invented certain new and useful Improvements in Pocket-Knives, of which the following is a specification, reference being had therein to the accompanying drawings.

This invention relates to certain improvements in pocket-knives, which improvements are fully set forth in the following specification and claims, reference being had to the following-described drawings hereto annexed, making a part of this specification, in which—

Figure 1 is a perspective view, showing its blade closed and as it appears in a finished state. Fig. 2 is a vertical longitudinal section through the handle at one side of the blade and blade-spring. Fig. 3 is a side view of the handle of the knife as it would appear before its bolster or the blade has been attached. Fig. 4 is a cross-section of the handle of the knife at about its center. Fig. 5 is a cross-section of the handle of the knife and through its bolster and the tubular pin which hinges the blade to the handle, to show the manner in which the bolster is cast around the end of the handle and through the tubular pin to give strength and durability to that part of the knife. Fig. 6 is a side plan view of the blade-spring of the knife. Fig. 7 is a perspective view of the tubular pin which is used to hinge the blade to the handle, and Fig. 8 is a cross-section of the handle to show the lining in the inner surfaces of the handle.

The novelty in this invention consists in the construction and arrangement of all the parts of the knife except the blade, which may be of the ordinary pattern.

The handle D of the knife is formed from a solid and single piece of any suitable material for that purpose, having the end E, to which the blade B is hinged, reduced in size or diameter from that of the remainder of the handle as far back from the extreme end as the bolster c is calculated to be cast or placed, as shown in Fig. 3. After the handle is formed as shown in said figure it is channeled longitudinally for the reception of the blade, as shown at S in Figs. 2, 4, and 5, which will complete its form.

The blade B is attached to handle D by means of the pin P, passing through the pin or rivet hole in the end of the handle D and through the shank of the blade after the spring R has been placed in position, in the manner as shown in Fig. 2, after which the bolster c is cast or placed around the end of the handle, as shown in said figure and in Figs. 1 and 5, in such manner as to be firmly connected with the tubular pin P, to thoroughly attach the bolster to the handle, and to connect the two sides of the bolster, as shown in Fig. 5.

The spring R, which is placed under the tang of blade B for the said tang to work upon to hold the blade in its proper positions either open or closed, is formed as is shown in Figs. 2 and 6, having on the outer end of its lower part an integral depending lug to overhang and shoulder against the bolster c, and is for the purpose of preventing said spring from being driven out of position into the handle by the blade when it is opened, and the curved part R' of said spring is formed to hold the spring spread apart a little more at that place than at the ends where the blade-tang engages with it to prevent the spring from working out of the handle. When the handle has thus been provided with the parts as described, it is ready to be finished and polished in a manner suitable for the kind of material used.

The bolster c may, if desired, be formed separate from the handle D and be attached to the handle when cold, and in such case a rivet is used to connect the sides of the bolster and thoroughly fasten it together.

The handle may, when desired, be provided with a thin lining on the sides or on the bottom of its channel, as shown at S' in cross-section in Fig. 8, and it may be of any suitable design and be provided with more than one blade either at one or both ends, and may have separate springs for each blade.

Having thus described my invention, what I claim as new, and desire to secure by Letters Patent, is as follows, to wit:

1. The combination of the knife-handle D, formed of one piece of material, as shown and described, having the knife-channel S, tubular pin P, U-shaped spring R, having the depending lug G, knife-blade B, and bolster c, formed of one piece of metal and attached to the handle D by being cast or pressed thereon, substantially as set forth.

2. As a new article of manufacture, a knife constructed and arranged substantially as shown and described, having its handle and its bolsters each respectively formed of one piece of material, and having its blade spring or springs formed U-shaped and placed within the handle so one of its prongs will engage the tang of the blade, as set forth.

3. In the knife constructed substantially as shown and described, the U-shaped spring R, having the depending lug G, in combination with the handle D and blade B, as and for the purpose set forth.

CLARENCE H. KAHLER.

Witnesses:
WM. J. HUTCHINS,
THOS. H. HUTCHINS.